United States Patent
Wilson et al.

(10) Patent No.: US 6,989,987 B1
(45) Date of Patent: Jan. 24, 2006

(54) RECONFIGURABLE COMPUTER MONITOR

(76) Inventors: Marqueta Wilson, 3023 Elinor St., Fort Worth, TX (US) 76111; Prescilla M. Wilson, 3023 Elinor St., Fort Worth, TX (US) 76111

( * ) Notice: Subject to any disclaimer, the term of this patent is extended or adjusted under 35 U.S.C. 154(b) by 139 days.

(21) Appl. No.: 10/772,695

(22) Filed: Feb. 6, 2004

(51) Int. Cl.
H05K 5/00 (2006.01)
H05K 7/00 (2006.01)

(52) U.S. Cl. .................... 361/681; 361/685; 361/223.1

(58) Field of Classification Search .............. 361/681, 361/682, 683; 248/917; 345/169, 905; 312/223.1, 312/223.2, 223.3, 223.4, 223.5, 223.6
See application file for complete search history.

(56) References Cited

U.S. PATENT DOCUMENTS

| 3,653,740 | A | | 4/1972 | Ogura et al. | |
|---|---|---|---|---|---|
| 5,003,505 | A | | 3/1991 | McClelland | |
| 5,241,303 | A | | 8/1993 | Register et al. | |
| 5,319,582 | A | * | 6/1994 | Ma ........................... | 345/169 |
| 5,355,279 | A | * | 10/1994 | Lee et al. .................. | 361/681 |
| 5,390,075 | A | | 2/1995 | English et al. | |
| 5,508,757 | A | | 4/1996 | Chen | |
| 5,651,594 | A | | 7/1997 | Lechman | |
| 5,745,340 | A | * | 4/1998 | Landau ...................... | 361/681 |
| 5,796,576 | A | * | 8/1998 | Kim .......................... | 361/681 |
| 5,805,415 | A | * | 9/1998 | Tran et al. ................. | 361/681 |
| 6,028,764 | A | * | 2/2000 | Richardson et al. ........ | 361/681 |
| 6,128,186 | A | | 10/2000 | Feierbach | |
| 6,195,254 | B1 | * | 2/2001 | Chang ........................ | 361/681 |
| 6,234,389 | B1 | * | 5/2001 | Valliani et al. ............. | 235/380 |
| 6,421,235 | B2 | * | 7/2002 | Ditzik ........................ | 361/683 |
| 6,442,018 | B1 | * | 8/2002 | Dinkin ....................... | 361/683 |
| 6,445,385 | B1 | * | 9/2002 | Shin et al. .................. | 345/204 |
| 6,480,374 | B1 | * | 11/2002 | Lee ............................ | 361/681 |
| 6,580,602 | B2 | | 6/2003 | Zodnik | |
| 6,593,859 | B1 | * | 7/2003 | Watanabe .................... | 341/20 |
| 6,804,110 | B2 | * | 10/2004 | Amemiya et al. .......... | 361/683 |
| 6,816,366 | B2 | * | 11/2004 | Ko ............................. | 361/683 |
| 2002/0114131 | A1 | * | 8/2002 | Forlenza et al. ............ | 361/685 |
| 2005/0047073 | A1 | * | 3/2005 | Lo ............................. | 361/683 |
| 2005/0073515 | A1 | * | 4/2005 | Kee et al. ................... | 345/204 |
| 2005/0111182 | A1 | * | 5/2005 | Lin et al. .................... | 361/686 |

* cited by examiner

*Primary Examiner*—Michael Datskovskiy
*Assistant Examiner*—Ingrid Wright
(74) *Attorney, Agent, or Firm*—Donald R Schoonover

(57) ABSTRACT

A computer monitor can be used as a monitor on a laptop, or on a desktop computer, or as a monitor that is supported on a stand and which can be connected to a CPU, or the like.

1 Claim, 2 Drawing Sheets

RECONFIGURABLE COMPUTER MONITOR

BACKGROUND OF THE INVENTION

1. Field of the Invention

The present invention relates to the general art of computers, and to the particular field of reconfigurable computers.

2. Discussion of the Related Art

A wide variety of computers are available to computer users. These computers range from large computers to desktop computers, to laptop computers, to notebook computers. Recently, handheld computers have also become available. People often use a variety of computers, depending on their situation. The data entered on one computer can be transferred to another computer for later use. For example, a person may take notes on a handheld computer during a meeting and then transfer those notes to his or her desktop computer when he or she returns to the office.

These situations may require a person to own several different computers. This can be expensive and it can be time consuming to transfer data from one computer to another.

Therefore, there is a need for a computer that can be reconfigured to meet a plurality of needs.

More specifically, it may be wasteful for a person to own both a handheld computer and a desktop computer and to transfer data from the handheld computer to the desktop computer.

Therefore, there is a need for a computer monitor that can be used with a central processing unit (CPU), or with a laptop or desktop computer, or the like.

Most people have a keyboard and a mouse on their desktop computer. It would be very efficient if a computer that is used away from the user's desk could simply be connected to the keyboard and mouse and other peripherals associated with the user's desktop computer and used as the desktop computer rather than taking time to transfer data from one computer to another.

Therefore, there is a need for a computer monitor that can be connected to a keyboard as well as to other forms of CPUs.

PRINCIPAL OBJECTS OF THE INVENTION

It is a main object of the present invention to provide a computer that can be reconfigured to meet a plurality of needs.

It is another object of the present invention to provide a computer monitor that can be used with a CPU, or the like.

It is another object of the present invention to provide a computer monitor that can be connected to a keyboard.

SUMMARY OF THE INVENTION

These, and other, objects are achieved by a reconfigurable computer monitor that can be used in connection with a keyboard or in connection with a CPU or the like. The monitor can be supported on a stand and connected to a CPU and to a mouse, or the like, or it can be connected to a keyboard and to a computer.

Using the reconfigurable computer monitor embodying the present invention will permit a user to use the computer as a handheld personal data assistant (PDA), or as a notepad, or as a computer monitor associated with a CPU or a desktop computer. Once connected to a keyboard, the computer monitor embodying the present invention can be operated in the manner of a desktop or a laptop computer.

BRIEF DESCRIPTION OF THE DRAWING FIGURES

DETAILED DESCRIPTION OF THE PREFERRED EMBODIMENT

Figure 2:
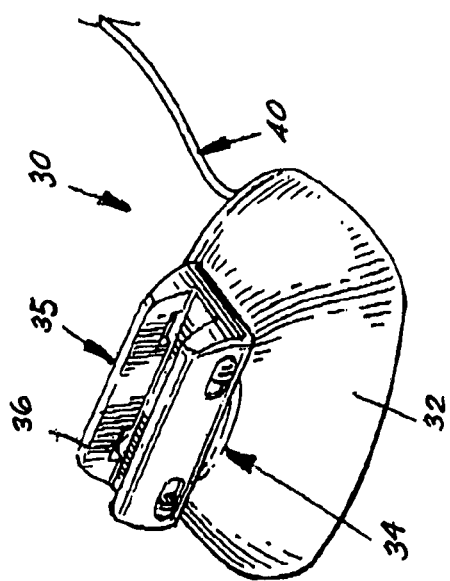
FIG. 2 is a perspective view of a stand for supporting the reconfigurable computer monitor in one configuration.
Figure 7:
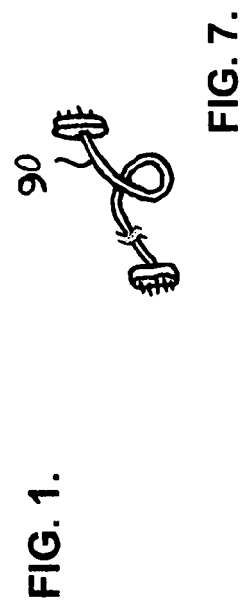
FIG. 7 shows a connection cable that can be used to connect the reconfigurable monitor of the present invention to either a keyboard or to the stand shown in FIG. 2.

Other objects, features and advantages of the invention will become apparent from a consideration of the following detailed description and the accompanying drawings.

Referring to the Figures, it can be understood that the present invention is embodied in a reconfigurable computer 10. Computer 10 comprises a main unit 12 which includes a monitor screen 14 which can be a flat panel screen if desired, floppy disc drive 16, a DVD disc drive 18, and an electrical connection 20 which can be a jack, or the like. Main unit 12 will function as a monitor screen when used in the manner shown in FIG. 1. Main unit 12 can be moved from the condition shown in FIG. 1 to the condition shown in FIG. 3.

As shown in FIG. 2, a stand unit 30 includes a base 32, a neck 34 which is swivably mounted on the base 32 of the stand unit 30 and a clamp unit 35 on the neck 34. The clamp unit 35 includes electrical connections 36 that are sized to electrically connect to the electrical connection 20 on the main unit 12. The clamp unit 35 makes electrical connection with appropriate electrical connectors on the main unit 12 to electrically connect the main unit 12 to the stand unit 30 to transfer data and the like to and from a CPU, or other such device. The main unit 12 thus can be moved about from the configuration shown in FIG. 1 to the configuration shown in FIG. 3.

Figure 3:
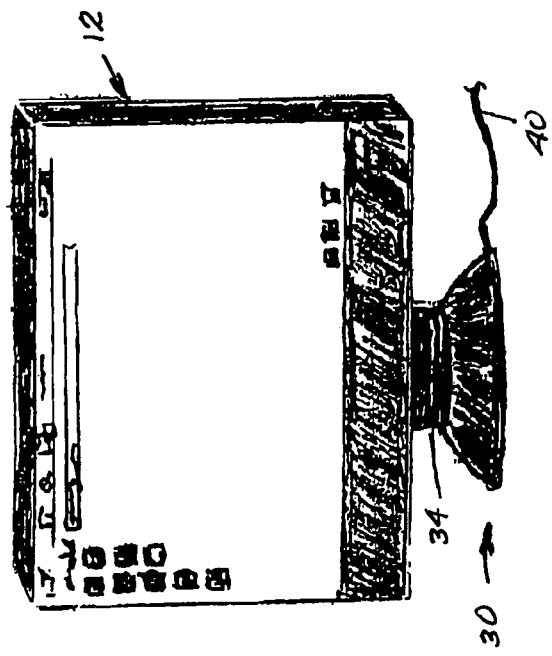
FIG. 3 is an elevational view of the reconfigurable computer monitor embodying the present invention in a second configuration supported on the stand shown in FIG. 2.

The clamp unit 35 further includes a connection cord 40 which connects the main unit 12 to a CPU 44 when the main unit 12 is used with the CPU as indicated in FIG. 3.

A computer unit 50 includes a keyboard 52, a battery unit 54, a video unit 56, a hardrive unit 58, a sound unit 60, a motherboard 62, a mouse unit 64, and a connection unit 66. The connection unit 66 can be a jack, or the like, and an appropriate connection cord can be used to connect computer unit 50 to the main unit 12 to transfer data, and the like.

Figure 1:
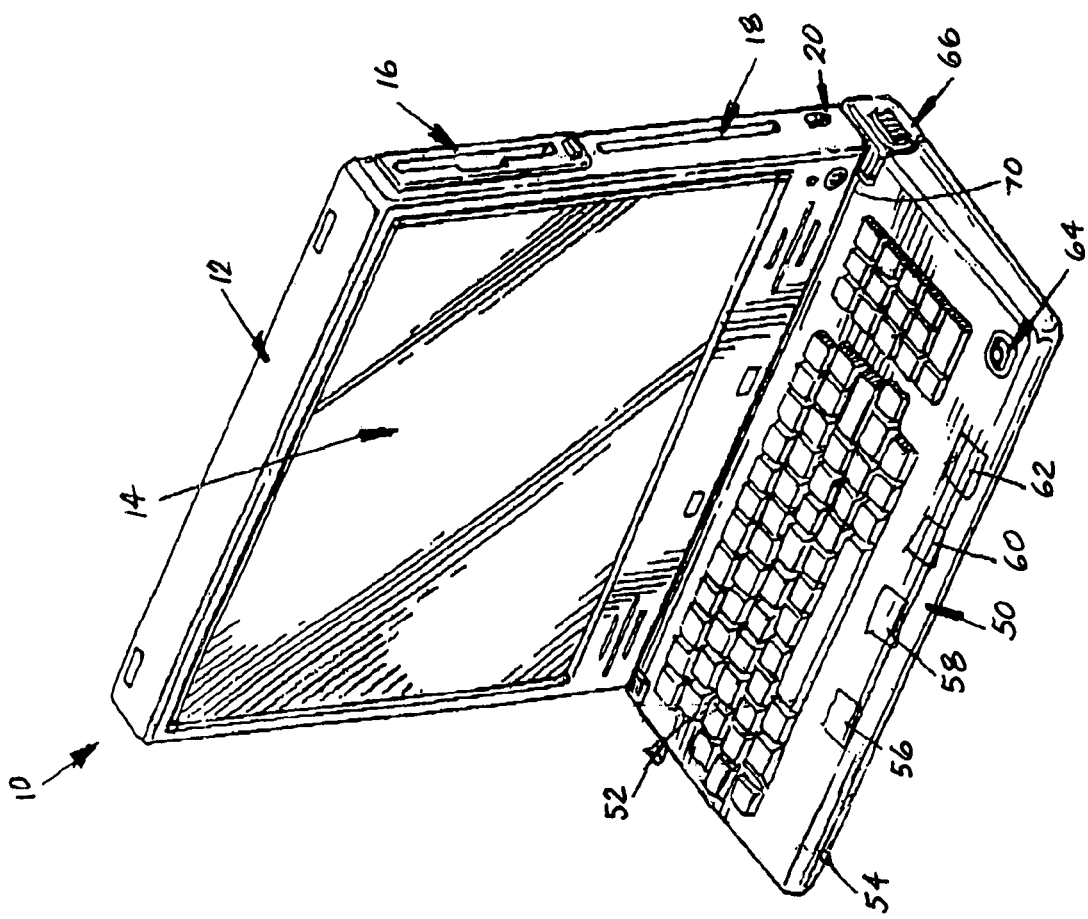
FIG. 1 is a perspective view of a reconfigurable computer monitor embodying the present invention connected to a keyboard of a computer.
Figure 5:
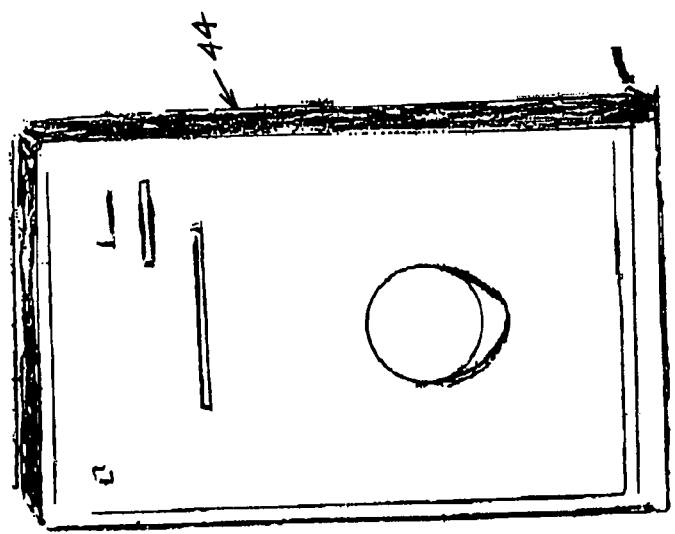
FIG. 5 shows a CPU that can be used in connection with the reconfigurable computer embodying the present invention.
Figure 6:
FIG. 6 shows a mouse that can be used in connection with the reconfigurable computer embodying the present invention.
Figure 4:
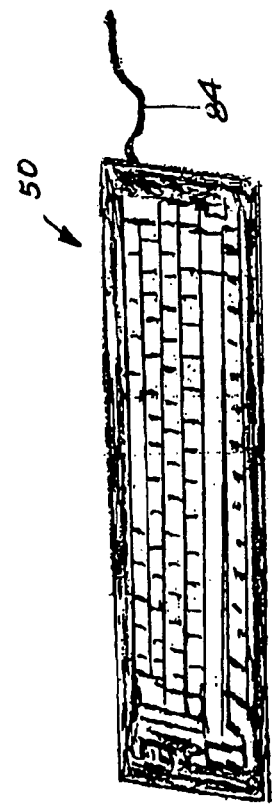
FIG. 4 shows a keyboard that can be used in connection with the reconfigurable computer embodying the present invention.

A hinge unit 70 hingeably connects the main unit 12 to the computer unit 50 when the main unit 12 is associated with the computer unit 50 as shown in FIG. 1. A separate mouse unit 80 can also be used with the computer unit 50 and the computer unit 50 can be connected to a power source via a power cord 84 as indicated in FIG. 4.

Alternatively, a cable 90 can be used to electrically connect the main unit either to computer unit 50 shown in FIG. 1 or to stand unit 30 shown in FIG. 2. Cable 90 has appropriate connections as do main unit 12, computer unit 50 and stand unit 30. The connections and cable are well known to those skilled in the art and thus will not be further discussed.

It is understood that while certain forms of the present invention have been illustrated and described herein, it is not to be limited to the specific forms or arrangements of parts described and shown.

What is claimed is:

1. A reconfigurable computer kit comprising:
  a) a main unit which includes
    (1) a monitor screen,
    (2) a floppy disc drive,
    (3) a DVD disc drive, and
    (4) an electrical connection;
  b) a stand unit which includes
    (1) a base,
    (2) a neck which is swivably mounted on the base of said stand unit,
    (3) a clamp unit on the neck,
    (4) electrical connections that are sized to electrically connect to the electrical connection on said main unit, and
    (5) a connection cord which connects said main unit to a CPU when said main unit is used with the CPU;
  c) a computer unit which includes
    (1) a keyboard,
    (2) a battery unit,
    (3) a video unit,
    (4) a hardrive unit,
    (5) a sound unit,
    (6) a motherboard,
    (7) a mouse unit, and
    (8) a connection unit; and
    (9) a hinge unit which hingeably connects said main unit to said computer unit when said main unit is associated with said computer unit.

* * * * *